United States Patent
Romito

(10) Patent No.: US 9,883,634 B2
(45) Date of Patent: Feb. 6, 2018

(54) ATTACHMENT FOR AIR BLOWER

(71) Applicant: Franco Romito, Whitestone, NY (US)

(72) Inventor: Franco Romito, Whitestone, NY (US)

(*) Notice: Subject to any disclaimer, the term of this patent is extended or adjusted under 35 U.S.C. 154(b) by 0 days.

(21) Appl. No.: 14/850,148

(22) Filed: Sep. 10, 2015

(65) Prior Publication Data

US 2015/0373922 A1 Dec. 31, 2015

Related U.S. Application Data

(63) Continuation-in-part of application No. 13/891,233, filed on May 10, 2013, now abandoned, which is a continuation-in-part of application No. 13/613,148, filed on Sep. 13, 2012, now abandoned.

(60) Provisional application No. 62/049,052, filed on Sep. 11, 2014.

(51) Int. Cl.
A47L 9/24 (2006.01)
A01G 1/12 (2006.01)

(52) U.S. Cl.
CPC .................................. A01G 1/125 (2013.01)

(58) Field of Classification Search
CPC ........ A47L 9/242; F16L 23/032; F16L 23/024
USPC .................. 15/414; 239/265.35; 285/179
See application file for complete search history.

(56) References Cited

U.S. PATENT DOCUMENTS

| | | | |
|---|---|---|---|
| 3,441,220 A * | 4/1969 | Wildner | B64C 9/38 239/265.35 |
| 3,776,467 A | 12/1973 | Riemerschmid | |
| 4,413,371 A | 11/1983 | Tuggle et al. | |
| 4,679,732 A * | 7/1987 | Woodward | F02K 1/004 239/265.35 |
| 4,913,354 A * | 4/1990 | Woodward | F02K 1/004 239/265.35 |
| 5,584,436 A | 12/1996 | Sepke | |
| 5,652,995 A | 8/1997 | Henke et al. | |
| 5,950,276 A | 9/1999 | Everts et al. | |
| 6,076,231 A | 6/2000 | Bucher | |
| 6,226,833 B1 | 5/2001 | Kawaguchi et al. | |
| 6,253,416 B1 | 7/2001 | Lauer et al. | |
| 6,519,810 B2 * | 2/2003 | Kim | A47L 9/02 15/331 |
| 6,526,624 B2 | 3/2003 | Miyamoto | |
| 6,592,057 B1 | 7/2003 | Ericksen et al. | |
| D481,497 S | 10/2003 | Malmqvist et al. | |
| 6,766,560 B2 | 7/2004 | Murphy | |
| 6,843,639 B2 | 1/2005 | Schutt | |
| 2003/0082016 A1 | 5/2003 | Eavenson, Sr. et al. | |
| 2004/0216264 A1 * | 11/2004 | Shaver | A47L 5/14 15/344 |
| 2005/0081326 A1 * | 4/2005 | Jeon | A47L 9/242 15/414 |
| 2005/0115018 A1 | 6/2005 | Jeon | |

(Continued)

*Primary Examiner* — Larry E Waggle, Jr.
*Assistant Examiner* — Henry Hong
(74) *Attorney, Agent, or Firm* — Gerald E. Hespos; Michael J. Porco; Matthew T. Hespos

(57) ABSTRACT

An adjustable attachment for a landscaping air blower includes a mounting tube, a nozzle and a connecting ring that rotatably couples the mounting ring and the nozzle. The upstream end of the nozzle defines a circle aligned at an acute angle to the axis of the nozzle and the downstream end of the mounting tube defines a circle aligned at an acute angle to the axis of the mounting tube. Rotation of the nozzle about its axis changes the alignment of the axis of the nozzle relative to the axis of the mounting tube.

10 Claims, 5 Drawing Sheets

(56) References Cited

U.S. PATENT DOCUMENTS

2008/0277919 A1* 11/2008 Valentini .................. A47L 9/242
                                                                        285/7
2009/0188067 A1* 7/2009 White ...................... A47L 9/02
                                                                        15/246.2

* cited by examiner

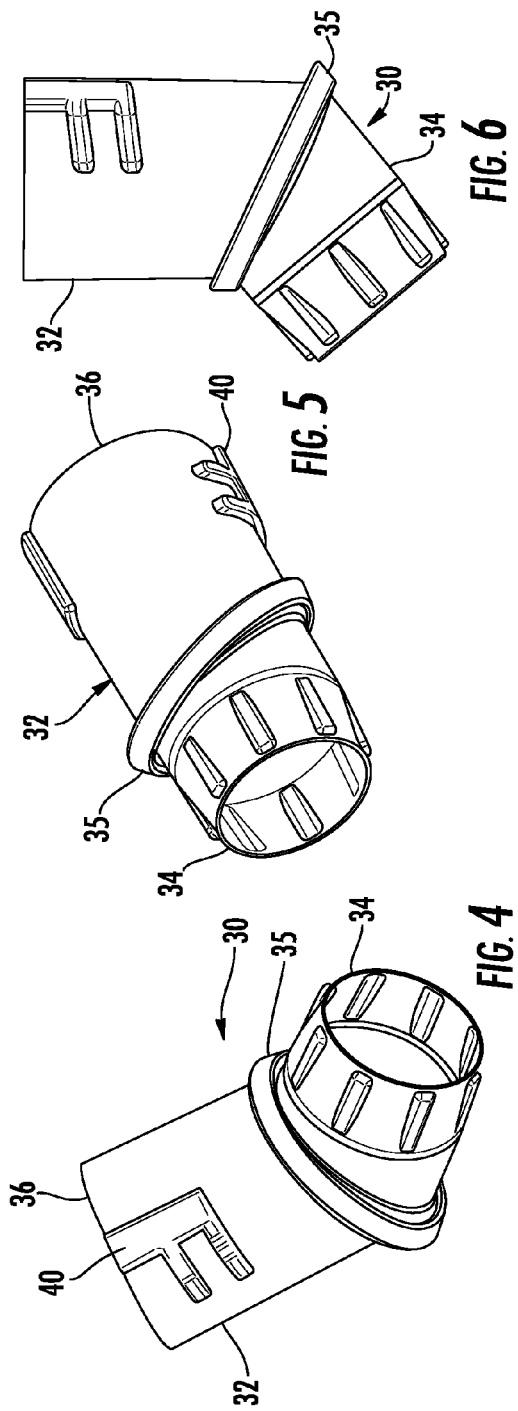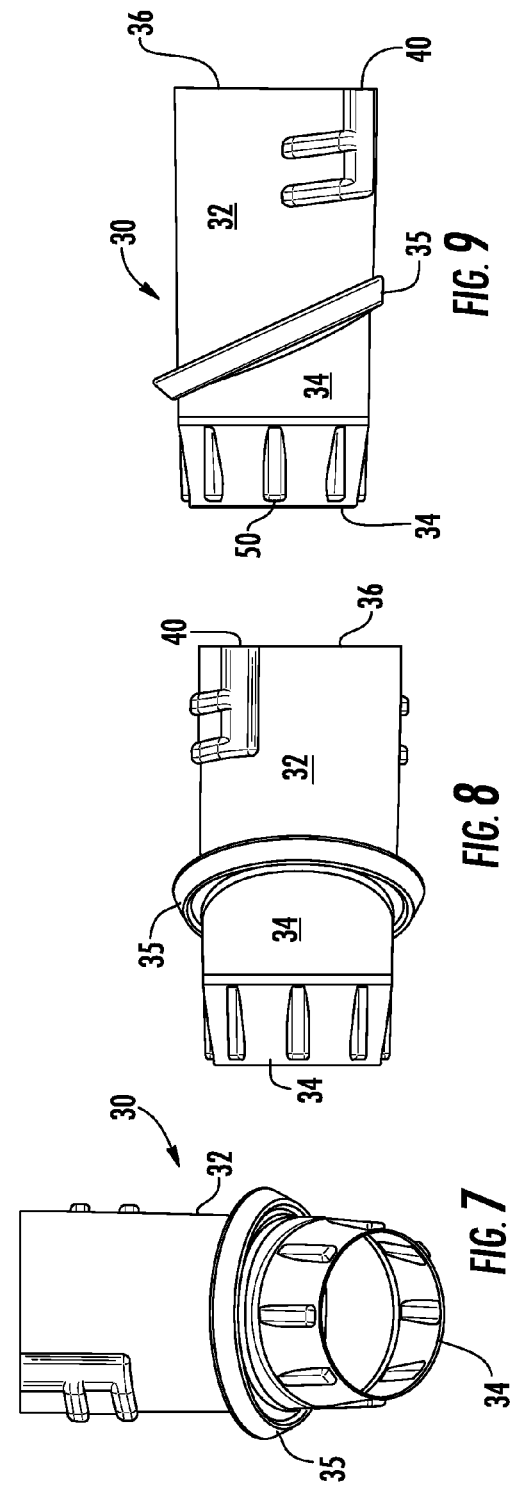

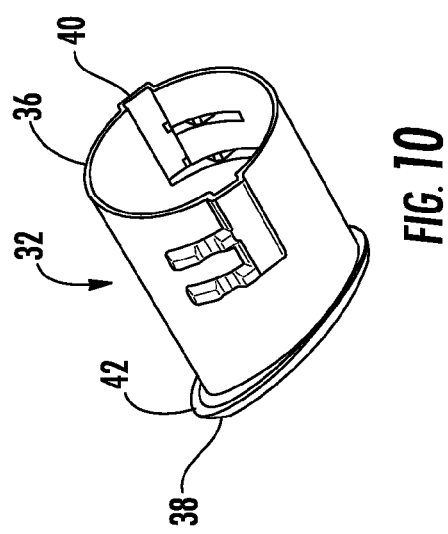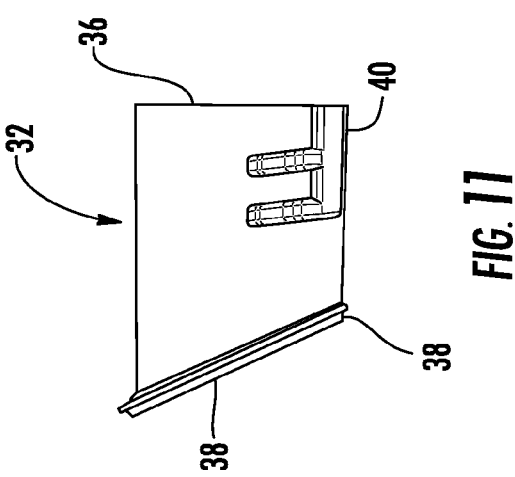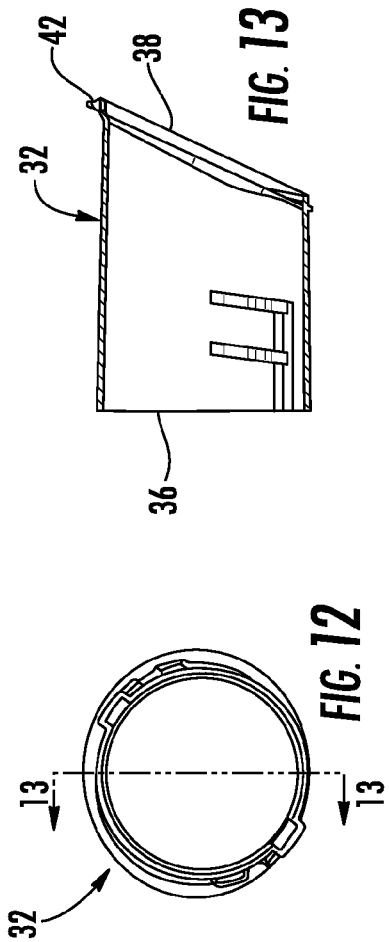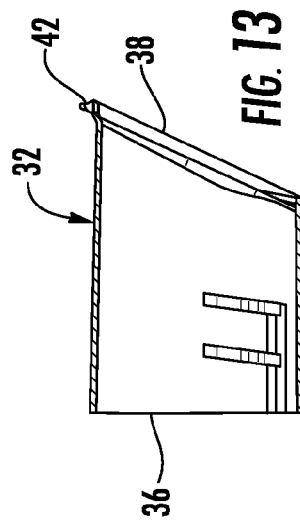

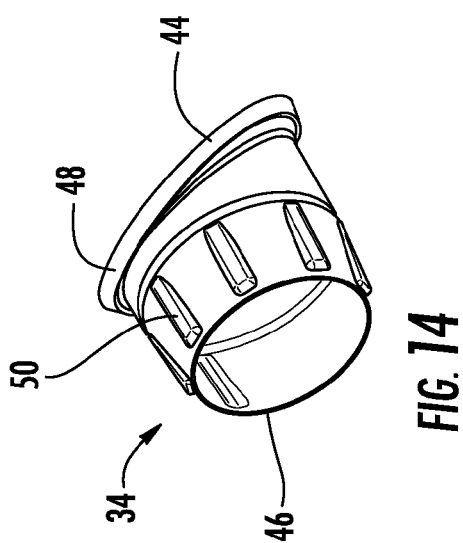
FIG. 14
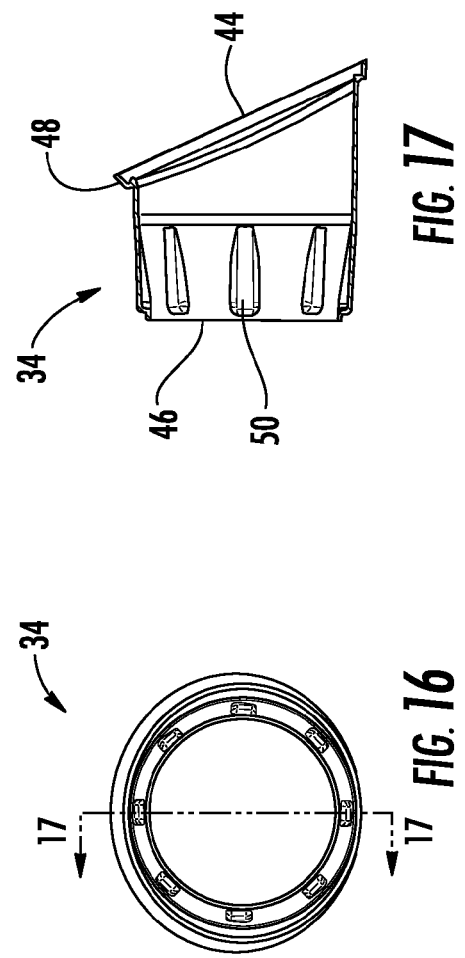
FIG. 17
FIG. 16
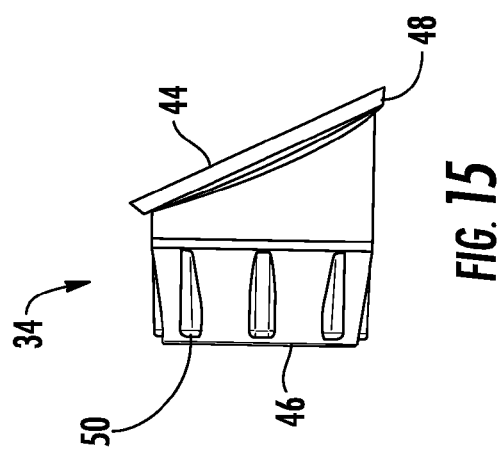
FIG. 15

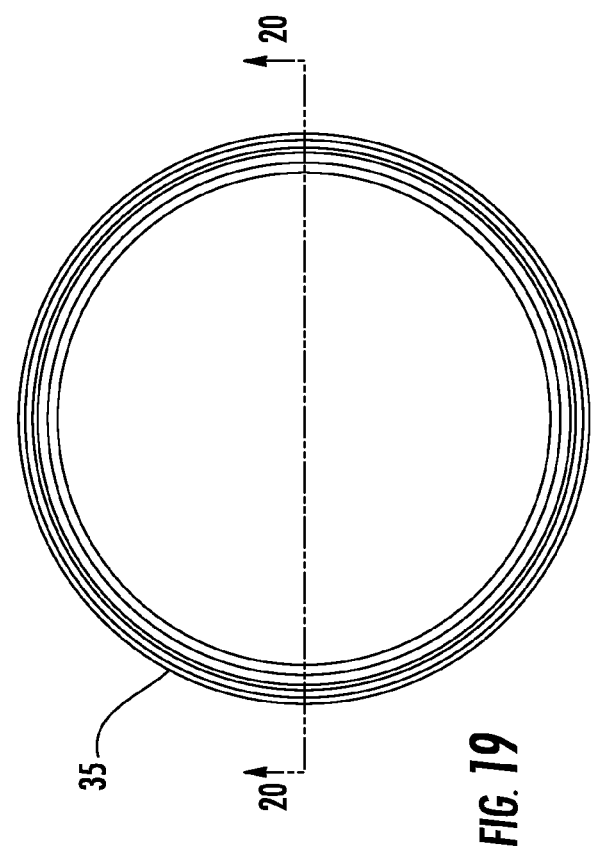
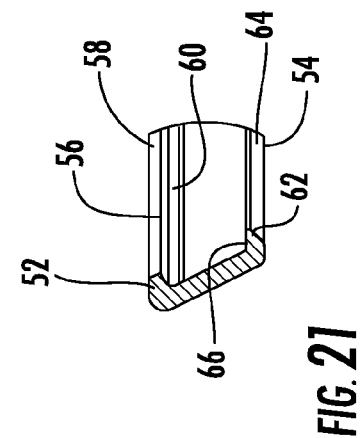

ATTACHMENT FOR AIR BLOWER

This application claims priority on U.S. Provisional Application No. 62/049,052 filed on Sep. 11, 2014. This application also is a continuation-in-part of U.S. application Ser. No. 13/891,233 filed on May 10, 2013, which is a continuation-in-part of U.S. application Ser. No. 13/613,148 filed on Sep. 13, 2012 which claims priority on U.S. Provisional Patent Appl. No. 61/645,817 filed on May 11, 2012. The entire disclosures of these prior applications are incorporated herein by reference.

BACKGROUND

1. Field of the Invention

The invention relates generally to air blowers for moving or collecting leaves, grass clippings and other debris, and further relates to a nozzle for such an air blower that enables the direction of the air flow produced by the air blower to be adjusted.

2. Description of the Related Art

Air blowers are used widely by landscapers to help collect and remove leaves, grass clippings and other such debris. The typical air blower includes a housing that contains a fan to produce a flow of high-pressure air. A tube communicates with the outlet of the fan and is manipulated by the user of the air blower to direct the airflow toward the debris that is to be removed. Air blowers take many different forms, including a wheeled air blower that is pushed from behind by the landscaper, a handheld air blower or a backpack type air blower.

A conventional known backpack air blower is identified generally by the numeral 10 in FIG. 1. The backpack air blower 10 includes a housing 12 that contains a motor and fan for generating a high-pressure flow of air. An outlet 14 communicates with the outlet of the housing 12 and generates the flow of air produced by the fan to a flexible tube 16. The flexible tube 16 is coupled releasably to a rigid tube 18 that has an outlet nozzle 20 aligned coaxially with the rigid tube 18. A handle 21 is mounted near the downstream end of the flexible tube 16 and extends transversely to the tubes 16, 18. The handle 21 can be gripped by the worker using the air blower 10 in an effort to direct the flow of air toward the targeted debris.

The rigid tube 18 shown in FIG. 1 generally will be aligned at an acute angle to the ground during use, as shown in FIG. 2. However, the exact angle of the rigid tube 18 will be a function of the size of the user. A tall person will have a larger angle, while a shorter person will have a smaller angle. The optimum angle of the rigid tube 18 will depend upon the nature of the debris that is being targeted and the characteristics of the landscape. For example, dry leaves will respond differently to the airflow than moist grass clippings. Additionally, removing debris from beneath a shrub may require the airflow from the rigid tube 18 to be nearly parallel to the ground. The user will determine the optimum angle of flow of air during the course of performing a landscaping job. As a result, the user will stoop to reduce the angle of the airflow to the ground during certain conditions and will hold the rigid tube 18 in a more upright orientation during other conditions. Stooping while carrying a heavy backpack can lead to back problems for the user.

FIG. 3 shows an example of a known rigid tube 22 with an outlet nozzle 24 aligned to the axis of the rigid tube 22 at an angle "a" greater than 90°. The rigid tube 22 is intended to facilitate blowing air for removing debris beneath a shrub. However, the angular alignment of the nozzle 24 to the ground still will be a function of the size of the landscaper, and stooping will be required for some landscapers. Furthermore, the angularly aligned nozzle 24 shown in FIG. 3 is not optimum for all types of debris. As result, a landscaper may have to carry both a linear rigid tube 18, as shown in FIGS. 1 and 2, and a rigid tube 22 within angularly aligned nozzle 24, as shown in FIG. 3, for use in other circumstances.

The prior art also includes sheet metal ducts used for heating and air-conditioning systems and to vent air from a clothes dryer. Some such sheet-metal ducts are formed as an adjustable fitting formed from two cylindrical duct sections. One end of each of the duct sections in such an adjustable fitting is formed to define an angle to the axis of the cylinder. Each of these angularly aligned ends is formed with a continuous bead extending around the circumference of the duct. The continuous circumferential beads at the ends of these duct sections are permanently engaged with one another, but permit rotation of the duct sections relative to one another. This rotation will change the angular alignment of the two duct sections of the fitting. These duct sections typically are set at a specified angle and are positioned in a wall of a building. The duct sections are unlikely to ever be moved after being positioned at the required angle and set in the wall of the building. The adjustable sheet-metal fitting for a heating or air conditioning system or for a dryer vent is not readily adaptable to an air blower for landscaping purposes. More particularly, the outlet duct of a landscaping air blower frequently is contacted with the ground, curbs, rocks, trees and the like in a way that would permanently damage the sheet metal fitting. The continuous circumferential sheet-metal beads that connect the two duct sections to one another would not enable rigid sturdy plastic tubes to be connected to one another. Additionally, the two duct sections of an adjustable fitting for a heating or air conditioning system or for a dryer vent are not easily adjustable, in part due to the difficulty of gripping the adjustable sheet metal members.

In view of the above, it is an object of the invention to provide an attachment for a landscaping air blower that enables the user to adjust the angle of the airflow in accordance with the size of the landscaper and the characteristics of the landscaping debris that is being blown.

It is another object of the subject invention to provide an adjustable outlet nozzle for a landscaping air blower that is sturdy and not likely to be damaged during normal use.

It is a further object of the invention to provide an adjustable outlet nozzle for an air blower that enables the nozzle to be adjusted easily regardless of the size of the hands of the person performing the adjustment.

SUMMARY OF THE INVENTION

The invention relates to an adjustable attachment for a landscaping air blower. The adjustable attachment includes a mounting tube, an adjustable nozzle and a connecting ring. The mounting tube is formed from a plastic material and has opposite upstream and downstream ends. Portions of the mounting tube adjacent the upstream end may be substantially cylindrical, and the upstream end may define a plane aligned normal to the axis of the cylindrical tube. Areas of the mounting tube adjacent the upstream end may include structure for connecting the mounting tube to a tubular member of the air blower. The configuration of the mounting structure may vary depending upon the configuration of the air blower. For example, the upstream end of the mounting tube may define part of a bayonet connection with one or more axial grooves extending from the upstream end of the mounting tube toward the downstream end and circumferential grooves extending from ends of the axial grooves spaced from the upstream end of the mounting tube. These grooves may be connected to one or more projections on a tubular component of the air blower. Thus, the mounting tube of the adjustable attachment can be connected to the tubular component of the air blower simply by advancing the mounting tube axially into or onto the tubular component of the air blower and then rotating the mounting tube. Other connections also can be provided.

Areas of the mounting tube adjacent the downstream end of the mounting tube may assume an elliptical cross-section. The extreme downstream end defines a plane aligned at an acute angle to the axis of the mounting tube with the orientation of the angle relative to the major and minor axes of the ellipse being selected so that the extreme downstream end of the mounting tube defines a circle. A circumferential bead or groove may extend around the downstream end of the mounting tube.

The nozzle also is formed from a plastic material and defines a tube having upstream and downstream ends and may taper toward the downstream end. Areas of the nozzle adjacent the upstream end of the nozzle may have a substantially elliptical cross-section. The extreme upstream end defines a plane aligned at an acute angle to the axis of the nozzle with the orientation of the angle relative to the major and minor axes of the ellipse being selected so that the extreme upstream end defines a circle. The downstream end of the nozzle may be aligned perpendicular to the axis of the nozzle. A mounting bead or groove may be formed at the upstream end of the nozzle.

Portions of the nozzle substantially adjacent the downstream end may include a plurality of axially extending ribs or other surface discontinuities to facilitate gripping and manipulation of the nozzle and to provide a reinforcement for preventing damage to the nozzle that might otherwise occur when the nozzle strikes the ground, a curb or a stone. The ribs of the nozzle ensure that the nozzle can be rotated manually to adjust the angular alignment of the nozzle regardless of the size of the hands of the landscaper who uses the adjustable attachment.

The connecting ring also is formed from plastic and defines an axially short truncated cone with circular upstream and downstream ends. Opposite ends of the connecting ring include an annular bead projecting inward on the connecting ring. The inside diameter of each bead is slightly smaller than the corresponding beads on the downstream end of the mounting tube and on the upstream end of the nozzle. The plastic of the connecting ring, the mounting tube and the nozzle is sufficiently resilient to enable the connecting ring to snap into engagement with the mounting tube and the nozzle for holding the nozzle in proximity to the mounting tube. However, the relative dimensions of the beads on the connecting ring and the nozzle permit rotation of the nozzle relative to the connecting ring and the mounting tube. This rotation enables the angular alignment of the axis of the nozzle to be adjusted relative to the axis of the mounting tube.

The plastic of the nozzle and the mounting tube are sufficiently rigid to resist damage to the nozzle and the mounting tube during normal use. However, damage always is a possibility. In the event of damage, a replacement nozzle easily can be mounted on the mounting tube merely by snapping a new nozzle into engagement with the connecting ring and/or snapping a new connecting ring into engagement with the mounting tube.

The adjustable attachment for the landscaping air blower enables the landscaper to adjust the angle of airflow easily in accordance with characteristics of the landscape and the debris that is being moved. The adjustments also enable the landscaper to achieve the proper alignment of the airflow in accordance with the physical dimensions (e.g. height) of the landscaper. The adjustable attachment for the air blower is not limited to landscaping applications. For instance, the adjustable attachment for the air blower can be used to clear debris and for other purposes by construction workers, highway workers, roofers, and the like.

BRIEF DESCRIPTION OF THE DRAWINGS

FIG. 4 is a perspective view of the adjustable attachment in accordance with an embodiment of the invention with the nozzle of the attachment angularly aligned to the mounting tube of the attachment.

FIG. 5 is a second perspective view of the adjustable attachment shown in FIG. 4 with the nozzle aligned linearly with the mounting tube.

FIG. 6 is a side elevational view of the attachment shown in the alignment of FIG. 4.

FIG. 7 is a top plan view of the attachment shown in the alignment of FIG. 4.

FIG. 8 is a top plan view of the attachment shown in the alignment of FIG. 5.

FIG. 9 is a side elevational view of the attachment shown in the alignment of FIG. 5.

FIG. 10 is a perspective view of the mounting tube of the attachment shown in the alignment of FIG. 1-9.

FIG. 11 is a side elevational view of the mounting tube shown in FIG. 10.

FIG. 12 is a front elevational view of the mounting tube.

FIG. 13 is a cross-sectional view taken along line 13-13 of FIG. 12.

FIG. 14 is a perspective view of the nozzle of the attachment shown in the alignment of FIG. 1-9.

FIG. 15 is a side elevational view of the nozzle shown in FIG. 14.

FIG. 16 is a front elevational view of the nozzle.

FIG. 17 is a cross-sectional view taken along line 16-16 of FIG. 16.

FIG. 18 is a side elevational view of the connecting ring of the attachment shown in the alignment of FIG. 1-9.

FIG. 19 is a top plan view of the connecting ring shown in FIG. 18.

FIG. 20 is a cross-sectional view taken along line 20-20 of FIG. 19.

FIG. 21 is an enlarged cross-sectional view of a region of the connecting ring shown in FIG. 20.

DETAILED DESCRIPTION

Figure 1:
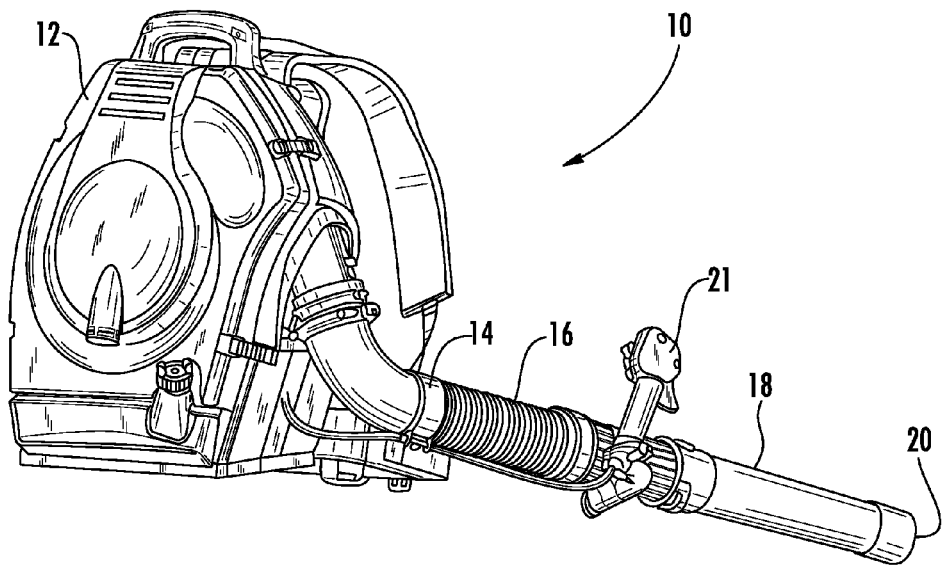
FIG. 1 is a perspective view of a prior art landscaping air blower.
Figure 2:
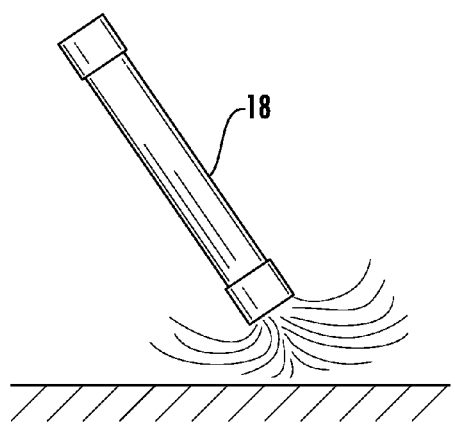
FIG. 2 is a side elevational view of linear outlet tube for the prior art landscaping air blower of FIG. 1.
Figure 3:
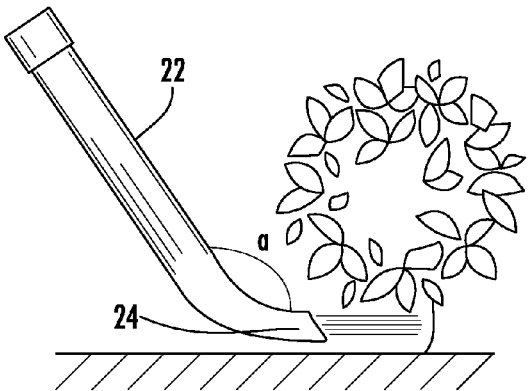
FIG. 3 is a side elevational view of a prior art outlet to with a fixed angularly aligned outlet nozzle for use with the landscaping air blower of FIG. 1.

An adjustable attachment for a landscaping air blower in accordance with the invention is identified generally by the 30 in FIGS. 4-21. The adjustable attachment 30 includes a mounting tube 32, a nozzle 34 and a connecting ring 35 all of which are formed from a plastic material. The mounting tube 32 is tubular and has an upstream end 36 aligned substantially normal to the axis of the mounting tube 32 and a downstream end 38 aligned at an acute angle of about 65° to the longitudinal axis of the mounting tube 32. Regions of the mounting tube 32 adjacent the upstream end 36 are substantially cylindrical. Bayonet type mounting grooves 40 are formed adjacent the upstream end 36 and are configured to mate with a tubular component of the prior art landscaping air blower, such as the air blower 10 illustrated in FIG. 1. Regions of the mounting tube 32 adjacent the downstream end are elliptical. The acute angle downstream end 38 of the mounting tube 32 is oriented at an angle relative to the major and minor axes of the ellipse so that the extreme downstream end 38 is circular. The downstream end 38 of the mounting tube 32 includes a continuous circumferential bead 42 on the outer circumferential surface thereof.

The nozzle 34 is a slightly tapered tubular structure with opposite upstream and downstream ends 44 and 46. The tapered shape of the nozzle 34 contributes to accelerated air flow and also enables the connecting ring 35 to be telescoped onto the nozzle, as explained below. The downstream end 46 of the nozzle 34 lies in a plane substantially normal to the axis of the nozzle 34. Regions of the nozzle 34 adjacent the upstream end are substantially elliptical. The extreme upstream end 44 of the nozzle 34 is aligned at an acute angle to the axis of the nozzle 34, and more particularly at an angle corresponding to the angular alignment of the downstream end 38 of the mounting tube 32 (e.g. about 65°). Furthermore, the acute angular alignment of the upstream end of the nozzle 34 is oriented relative to the major and minor axes of the elliptical cross section so that the upstream end of the nozzle 34 is circular. A mounting bead 48 extends circumferentially around the outer perimeter of the upstream end of the nozzle 34. The outer circumferential surface of the nozzle 34 adjacent the downstream end 46 includes a plurality of circumferentially spaced, axially aligned ribs 50. The ribs 50 function to reinforce the nozzle, thereby reducing the likelihood of damage caused to the nozzle by contact with the ground, rocks, curbs, walls and the like. Additionally, the ribs project out sufficiently to define grips for manipulating the nozzle 34 relative to the remainder of the attachment 30.

The connecting ring 35 has a short truncated conical shape with a round upstream end 52 and a round downstream end 54 that is cross-sectionally smaller than the upstream end 52. The upstream end 52 of the connecting ring 35 is characterized by an inwardly projecting circumferential upstream lip 56 with a tapered outer surface 58 aligned to flare out at positions closer to the extreme upstream end 52. The upstream lip 56 further has an inwardly facing engaging surface 60. Similarly, the downstream end 54 of the connecting ring 35 is characterized by an inwardly projecting circumferential downstream lip 62 with a tapered outer surface 64 aligned to flare out at positions closer to the extreme downstream end 54. The downstream lip 62 further has an inwardly facing engaging surface 66.

The adjustable attachment 30 is assembled by telescoping the upstream end 52 of the connecting ring 35 over the downstream end 46 of the nozzle 34 sufficiently for the inwardly facing engaging surface 66 of the downstream lip 62 to contact the mounting bead 48 that extends circumferentially around the outer perimeter of the upstream end of the nozzle 34, thereby preventing further upstream movement of the connecting ring 35 while permitting sliding rotation of the downstream lip 62 of the connecting ring 35 relative to the mounting bead 48 of the nozzle 34. Additionally, the upstream end 52 of the connecting ring 35 projects axially upstream beyond the nozzle 34. The upstream lip 56 of the connecting ring 35 then is snapped into engagement with the circumferential bead 42 on the downstream end 38 of the mounting tube 32. More particularly, the tapered outer surface 58 of the upstream lip 56 will cause a slight inward deflection of the downstream end 38 of the mounting tube 32 and/or an outward deflection of the connecting ring 35 as the upstream lip 56 passes over the circumferential bead 42 on the downstream end 38 of the mounting tube 32. The downstream end 38 of the mounting tube 32 and/or the connecting ring 35 will resiliently restore when the upstream lip 56 of the connecting ring 35 passes the circumferential bead 42 on the downstream end 38 of the mounting tube 32, thereby retaining the connecting ring 35 on the downstream end 38 of the mounting tube 32.

As noted above, the downstream end 38 of the mounting tube 32 and the upstream end 44 of the nozzle 34 are circular and the connecting ring 35 is circular. The engagement of the circular bead 42 on the downstream end 38 of the mounting tube 32 and the circular bead 48 on the upstream end 44 of the nozzle 34 with the circular lips 56 and 62 on the connecting ring 35 enables the nozzle 34 and the connecting ring 35 to be rotated relative to the mounting tube 32. Additionally, the angular alignment of the downstream end 38 of the mounting tube 32 and the upstream end 44 of the nozzle 34 enables the axial alignment of the nozzle 34 to be changed as the nozzle 34 is rotated relative to the mounting tube 32. Thus, the nozzle can be rotated from the orientation of FIGS. 5, 8 and 9, where the axis of the mounting tube 32 and the axis of the nozzle 34 align, to the orientation shown in FIGS. 4, 6 and 7, where the axis of the nozzle 34 is aligned at an acute angle of approximately 50° to the axis of the mounting tube 32. The landscaper can easily grip the ribs 50 on the outer surface of the nozzle 34 to rotate the nozzle 34 relative to the mounting tube 32 and thereby can change the direction of air flow emitted from the nozzle 34 into a preferred angular orientation for the particular landscaping task height of the landscaper.

The ribs 50 on the outer surface of the nozzle 34 contribute to the strength of the nozzle 34 and make breakage unlikely. However, breakage remains a possibility. The attachment 30 can be reconditioned or restored in the event of breakage by separating a broken nozzle 34 and snapping a new nozzle 34 into engagement with the connecting ring 35. Additionally, the connecting ring 35 can be replaced if necessary by snapping the connecting ring 35 into engagement with the circular bead 42 on the downstream end 38 of the mounting tube 32.

It should be understand that the adjustable attachment for the air blower is not limited to landscaping applications. For instance, the adjustable attachment for the air blower can be used to clear debris and for other purposes by construction workers, highway workers, roofers, and the like.

Continuous annular beads are shown as being formed on the downstream end of the mounting tube and the upstream end of the nozzle. However, other mounting structures can be provided. For example, resiliently deflectable mounting fingers can be provided on the downstream end of the mounting tube, the upstream end of the nozzle and/or on one or both ends of the connecting ring. Similarly, discontinuous beads can be provided.

What is claimed is:

1. An adjustable attachment for an air blower, comprising:
   a mounting tube having an upstream end configured for connection to the air blower, a downstream end opposite the upstream end and a longitudinal axis extending linearly between the upstream and downstream ends of the mounting tube, the downstream end of the mounting tube being aligned at a first acute angle to the longitudinal axis of the mounting tube;
a connecting ring having opposite upstream and downstream ends, the upstream end of the connecting ring being connected to the downstream end of the mounting tube to define a mounting tube connection, the upstream and downstream ends of the connecting ring being substantially circular; and
a tubular nozzle having opposite upstream and downstream ends and a longitudinal axis extending linearly between the upstream and downstream ends, the upstream end of the nozzle defining a plane aligned at a second acute angle to the longitudinal axis of the nozzle and being connected to the downstream end of the connecting ring to define a nozzle connection, at least one of the mounting tube connection and the nozzle connection being configured so that at least the nozzle is rotatable relative to the mounting tube and so that rotation of the nozzle relative to the mounting tube adjusts an angular alignment of the longitudinal axis of the nozzle relative to the longitudinal axis of the mounting tube from an orientation where the longitudinal axes of the mounting tube and the nozzle align to other orientations where the longitudinal axes of the mounting tube and the nozzle do not align, wherein
the upstream end of the nozzle has an outwardly extending circumferential bead extending around the upstream end of the nozzle, and the downstream end of the connecting ring has an inwardly extending lip configured for snapped engagement with the circumferential bead of the nozzle, and
the downstream end of the mounting tube has an outwardly extending circumferential bead extending around the downstream end of the mounting tube, and the upstream end of the connecting ring has an inwardly extending lip configured for snapped engagement with the circumferential bead of the mounting tube.

2. The adjustable attachment of claim 1, wherein the inwardly extending lip at the downstream end of the connecting ring flares outward at locations closer to the downstream end of the connecting ring for generating deflection of at least one of the connecting ring and the nozzle when connecting the connecting ring and the nozzle.

3. The adjustable attachment of claim 1, wherein the inwardly extending lip at the upstream end of the connecting ring flares outward at locations closer to the upstream end of the connecting ring for generating deflection of at least one of the connecting ring and the mounting tube when connecting the connecting ring and the mounting tube.

4. The adjustable attachment of claim 1 wherein the nozzle includes a plurality of outwardly projecting ribs to facilitate gripping and rotation of the nozzle relative to the mounting tube.

5. An air blower, comprising:
a blower apparatus for generating a flow of air;
a flexible tube having an upstream end connected to the blower apparatus for receiving the flow of air and a downstream end opposite the upstream end;
a mounting tube having an upstream end configured for connection to the flexible tube, a downstream end opposite the upstream end and a longitudinal axis extending linearly between the upstream and downstream ends of the mounting tube, the downstream end of the mounting tube being aligned at a first acute angle to the longitudinal axis of the mounting tube;
a connecting ring having opposite upstream and downstream ends, the upstream end of the connecting ring being connected to the downstream end of the mounting tube to define a mounting tube connection, the upstream and downstream ends of the connecting ring being substantially circular; and
a tubular nozzle having opposite upstream and downstream ends and a longitudinal axis extending linearly between the upstream and downstream ends, the upstream end of the nozzle defining a plane aligned at a second acute angle to the longitudinal axis of the nozzle and being connected to the downstream end of the connecting ring to define a nozzle connection, at least one of the mounting tube connection and the nozzle connection being configured so that at least the nozzle is rotatable relative to the mounting tube and so that rotation of the nozzle relative to the mounting tube adjusts an angular alignment of the longitudinal axis of the nozzle relative to the longitudinal axis of the mounting tube from an orientation where the longitudinal axes of the mounting tube and the nozzle align to other orientations where the longitudinal axes of the mounting tube and the nozzle do not align, wherein
the upstream end of the nozzle has an outwardly extending circumferential bead extending around the upstream end of the nozzle, and the downstream end of the connecting ring has an inwardly extending lip configured for snapped engagement with the circumferential bead of the nozzle, and
the downstream end of the mounting tube has an outwardly extending circumferential bead extending around the downstream end of the mounting tube, and the upstream end of the connecting ring has an inwardly extending lip configured for snapped engagement with the circumferential bead of the mounting tube.

6. The air blower of claim 5, wherein the inwardly extending lip at the downstream end of the connecting ring flares outwardly at locations closer to the downstream end of the connecting ring for generating deflection of at least one of the connecting ring and the nozzle when connecting the connecting ring and the nozzle.

7. The air blower of claim 5, wherein the inwardly extending lip at the upstream end of the connecting ring flares outwardly at locations closer to the upstream end of the connecting ring for generating deflection of at least one of the connecting ring and the mounting tube when connecting the connecting ring and the mounting.

8. The air blower of claim 5 wherein the nozzle includes a plurality of outwardly projecting ribs to facilitate gripping and rotation of the nozzle relative to the mounting tube.

9. The adjustable attachment of claim 1, wherein the first and second acute angles are equal.

10. The air blower of claim 5, wherein the first and second acute angles are equal.

\* \* \* \* \*